(12) United States Patent
Rau

(10) Patent No.: US 6,619,414 B2
(45) Date of Patent: Sep. 16, 2003

(54) PERSONAL MOBILITY VEHICLE

(76) Inventor: Harvey G. Rau, 222 Marion, Council Bluffs, IA (US) 51503

( * ) Notice: Subject to any disclaimer, the term of this patent is extended or adjusted under 35 U.S.C. 154(b) by 0 days.

(21) Appl. No.: 10/038,628

(22) Filed: Jan. 3, 2002

(65) Prior Publication Data

US 2003/0121705 A1 Jul. 3, 2003

(51) Int. Cl.[7] ................................................. A61G 5/06
(52) U.S. Cl. ................. 180/9.32; 180/9.1; 280/DIG. 10
(58) Field of Search ..................... 180/9.1, 9.26, 180/9.5, 9.52, 9.32, 65.1, 907; 280/5.22, DIG. 10

(56) References Cited

U.S. PATENT DOCUMENTS

| | | | |
|---|---|---|---|
| 3,068,950 A | * | 12/1962 | Davidson |
| 3,133,742 A | * | 5/1964 | Richison et al. |
| 3,231,290 A | * | 1/1966 | Weyer |
| 3,292,722 A | * | 12/1966 | Bamberg |
| 3,869,011 A | | 3/1975 | Jensen |
| 4,437,528 A | * | 3/1984 | Koehler et al. |
| 4,483,407 A | * | 11/1984 | Iwamoto et al. ............. 180/9.5 |
| 4,566,551 A | * | 1/1986 | Feliz ........................... 180/9.1 |
| 4,687,068 A | | 8/1987 | Pagett |
| 4,688,813 A | * | 8/1987 | Misawa et al. ............ 280/5.22 |
| 5,123,495 A | * | 6/1992 | Littlejohn et al. .......... 180/9.32 |
| 5,833,248 A | | 11/1998 | Eguchi |
| 6,325,167 B1 | * | 12/2001 | Jiang ........................... 180/9.32 |

* cited by examiner

Primary Examiner—Avraham Lerner

(57) ABSTRACT

A personal mobility vehicle includes a frame with a pair of parallel tracks for moving the vehicle, the track having a lower surface forming a drive plane for the tracks. A seat is operably mounted on the frame, and has a support for moving the seat about a generally horizontal axis normal to a longitudinal axis of the tracks, to maintain the seat in a generally upright position as the vehicle moves up or down a slope. The seat is also operably mounted for rotational movement on a vertical axis, to permit the seat to swivel. A lifter arm is operably mounted on the frame, with a forward end pivotally connected to the frame at a location spaced above the drive plane, and a rearward end pivotal between a lowered position spaced below the drive plane and a storage position spaced above the drive plane. A cylinder selectively raises and lowers the lifter arm to assist the vehicle in traversing the upper end of a flight of stairs, in either the ascending or descending directions.

6 Claims, 5 Drawing Sheets

PERSONAL MOBILITY VEHICLE

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to personal mobility vehicles, and more particularly to an improved vehicle that permits handicapped persons to freely move about the outdoors and up and down stairs without requiring the person to exit the vehicle.

(2) Background Information

The conventional wheelchair has long been the vehicle of choice for the physically handicapped, to move about, whether inside or outdoors. However, use of the conventional wheelchair outdoors poses a number of obstacles. The design of typically wheelchairs is acceptable for traversing a single step or curb, in most cases, although inconvenient and awkward. However, movement over a plurality of steps, over rough, grassy terrain, or other land surfaces which are not paved, is extremely difficult.

For such outdoor terrain, a variety of "specialty" wheelchairs have been designed. Such wheelchairs are typically designed for very specific outdoor purposes. For example, custom wheelchairs are known for use in racing or similar sport events, where speed over a hard surface is the environment for the vehicle. While acceptable for this purpose, such wheelchairs are not acceptable for other uses. It is therefore necessary for the person to change wheelchairs for the desired use. This is not only inconvenient and time-consuming, but also very costly.

BRIEF SUMMARY OF THE INVENTION

It is therefore a general object of the present invention to provide an improved personal mobility vehicle that is operable over a wide range of terrain types.

Another object of the present invention is to provide an improved personal mobility vehicle that will traverse steps as well as rough grassy terrain.

A further object is to provide a personal mobility vehicle that will assist the rider in stabilizing the vehicle at the upper end of stairs.

These and other objects of the present invention will be apparent to those skilled in the art.

The personal mobility vehicle of the present invention includes a frame with a pair of parallel tracks for moving the vehicle, the track having a lower surface forming a drive plane for the tracks. A seat is operably mounted on the frame, and has a support for moving the seat about a generally horizontal axis normal to a longitudinal axis of the tracks, to maintain the seat in a generally upright position as the vehicle moves up or down a slope. The seat is also operably mounted for rotational movement on a vertical axis, to permit the seat to swivel 180 degrees. The personal mobility vehicle includes a lifter arm operably mounted on the frame, with a forward end pivotally connected to the frame at a location spaced above the drive plane, and a rearward end pivotal between a lowered position spaced below the drive plane and a storage position spaced above the drive plane. A cylinder will selectively raise and lower the lifter arm to assist the vehicle in traversing the upper end of a flight of stairs, in either the ascending or descending directions.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
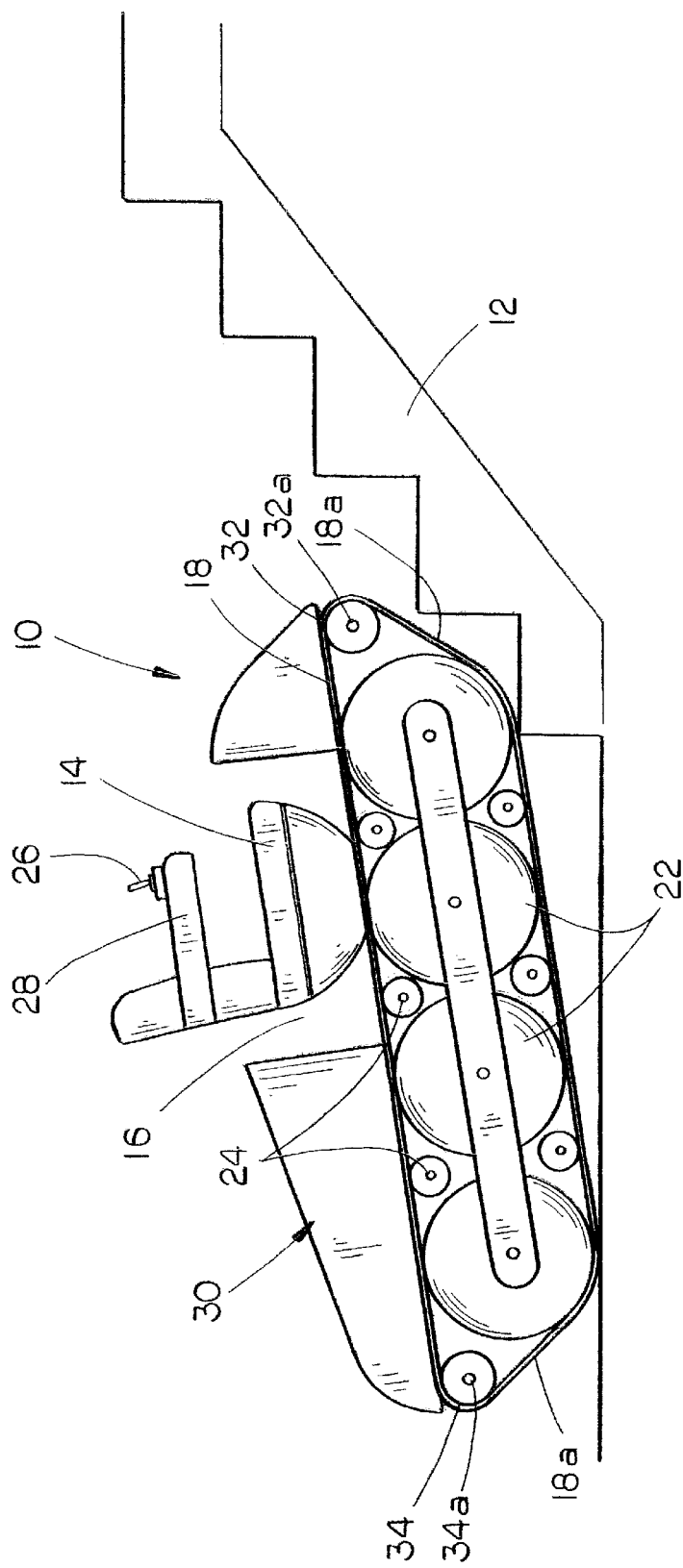
FIG. 1 is a side elevational view of the vehicle as it begins to ascend a flight of steps.

Referring now to the drawings, in which similar or corresponding parts are identified with the same reference numeral, and more particularly to FIG. 1, the personal mobility vehicle of the present invention is designated generally at 10. Vehicle 10 includes a seat 14 mounted in an operable cockpit 16, which will permit the seat to turn and pivot, as described in more detail hereinbelow, so that the rider maintains a stable horizontal ride.

Figure 3:
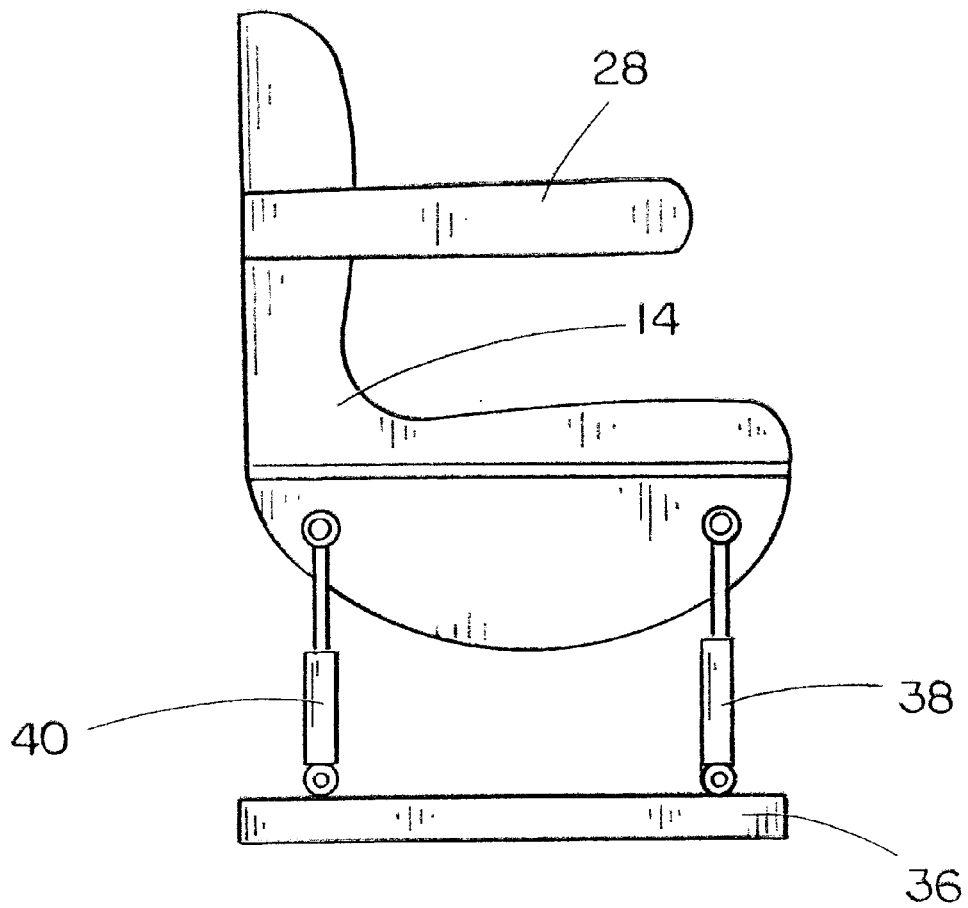
FIG. 3 is a detailed side view of the seat.

Vehicle 10 includes a pair of tracks 18 operably mounted on a frame 20, to drive and steer the vehicle. A plurality of drive wheels 22, and idler rollers 24 (shown in FIG. 3), are positioned within each track 18 to selectively drive the track in either the forward or rearward direction. A joystick 26 mounted on armrest 28 of seat 14, is used to drive and steer vehicle 10 by selectively operating one or both tracks 18 in a forward and/or rearward direction, in a conventional fashion of tracked vehicles, well known in the art. In the alternative, a steering wheel or other equivalent apparatus, could be used to drive and steer the vehicle 10, in a conventional fashion.

A housing 30 covers the motors (not shown) and tracks 18, to prevent accidental contact by the rider, or others nearby. Fenders or other housing attachments may also be added to the vehicle to further protect exposed portions of the tracks and frame.

Forward 32 and rearward 34 lift wheels are operably mounted forwardly of the forward-most drive wheels 22 within each track 18, and have centers 32*a* and 34*a* respectively, located above the centers of the drive wheels 22, in order to form an upwardly-sloping flight 18*a* at the forward and rearward ends of each track 18. It can be seen that each sloping flight 18*a* will assist in the lifting of the forward or rearward end of the vehicle 10 as the vehicle first contacts a set of steps or other object. This will, in turn, lift the end of the vehicle, to make the encounter more gradual as the stairs are engaged.

Figure 2:
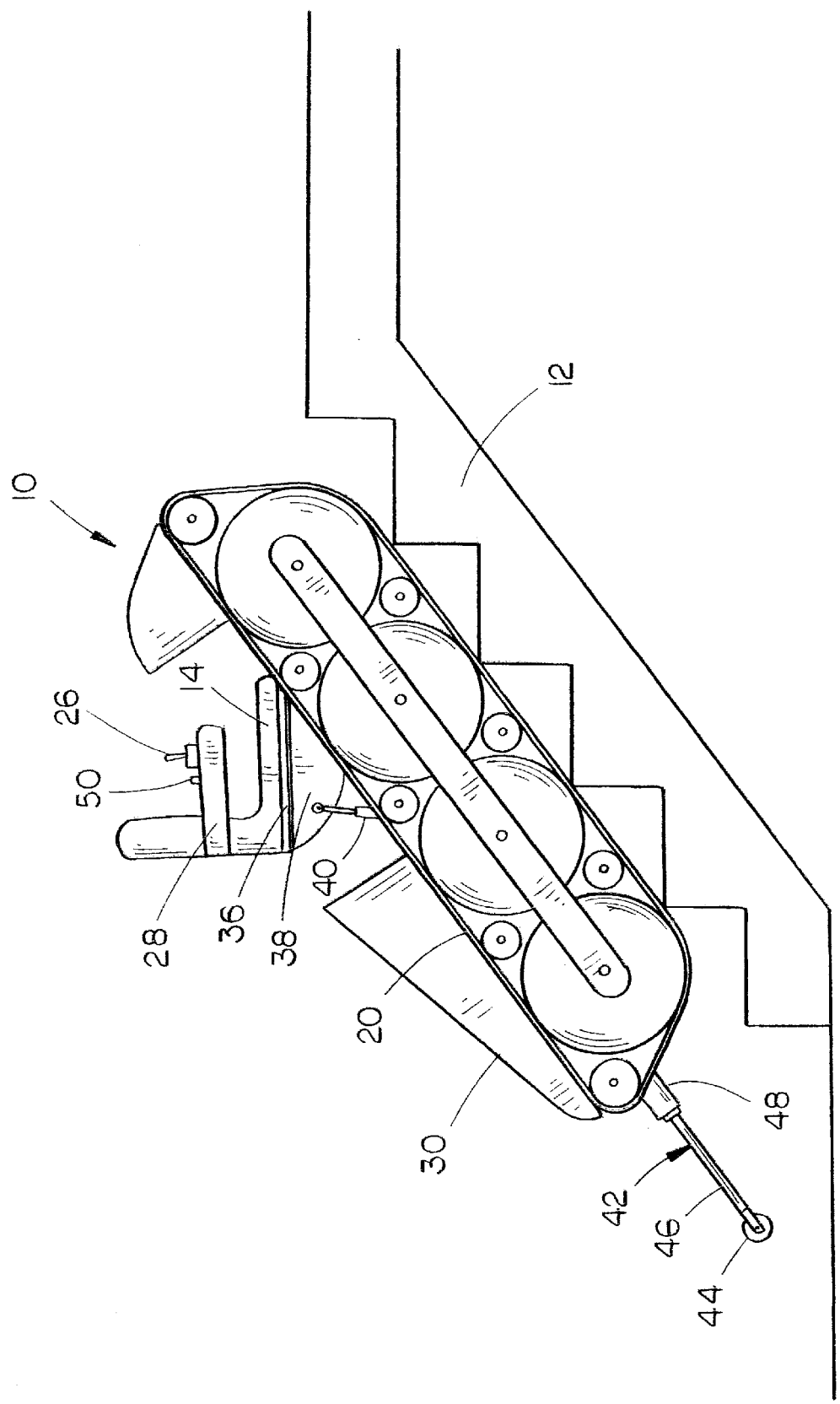
FIG. 2 is a view similar to FIG. 1, but with the vehicle ascending the steps.

Referring now to FIGS. 1 and 2, vehicle 10 is shown ascending a flight of stairs 12. As shown in more detail in FIG. 3, seat 14 is mounted on an annular bearing race 36, permitting the seat to rotate on a vertical axis, and thereby permitting the rider to turn to a side and exit the vehicle more easily. Seat 14 is preferably supported on sets of forward and rearward vertically-oriented extensible cylinders 38 and 40, respectively. Cylinders 38 and 40 are operable to raise or lower the forward and rearward edges of seat 14, to thereby maintain the seat in a horizontal orientation as the vehicle proceeds up or down a slope. The cylinders extend between seat 14 and bearing race 36, to permit rotation of the seat 14 independently of the forward/rearward tilt control. The rider is able to turn seat 14 on race 36 to face either forwardly or rearwardly, as the vehicle ascends or descends the stairs 12, and to the side to permit easy entry or exit from the vehicle 10.

Referring once again to FIG. 2, a retractable stabilizer 42 is mounted on the rearward end of housing 30, and may include a freewheeling roller 44 on the rearward end of a rod 46 that telescopes within a cylinder 48. As vehicle 10 ascends stairs 12, rod 46 is extended so that roller 44 is positioned to prevent the vehicle from tipping rearwardly as the vehicle ascends a slope. Rod 46 is extended and retracted by a switch 50 mounted on housing 30.

Figure 4:
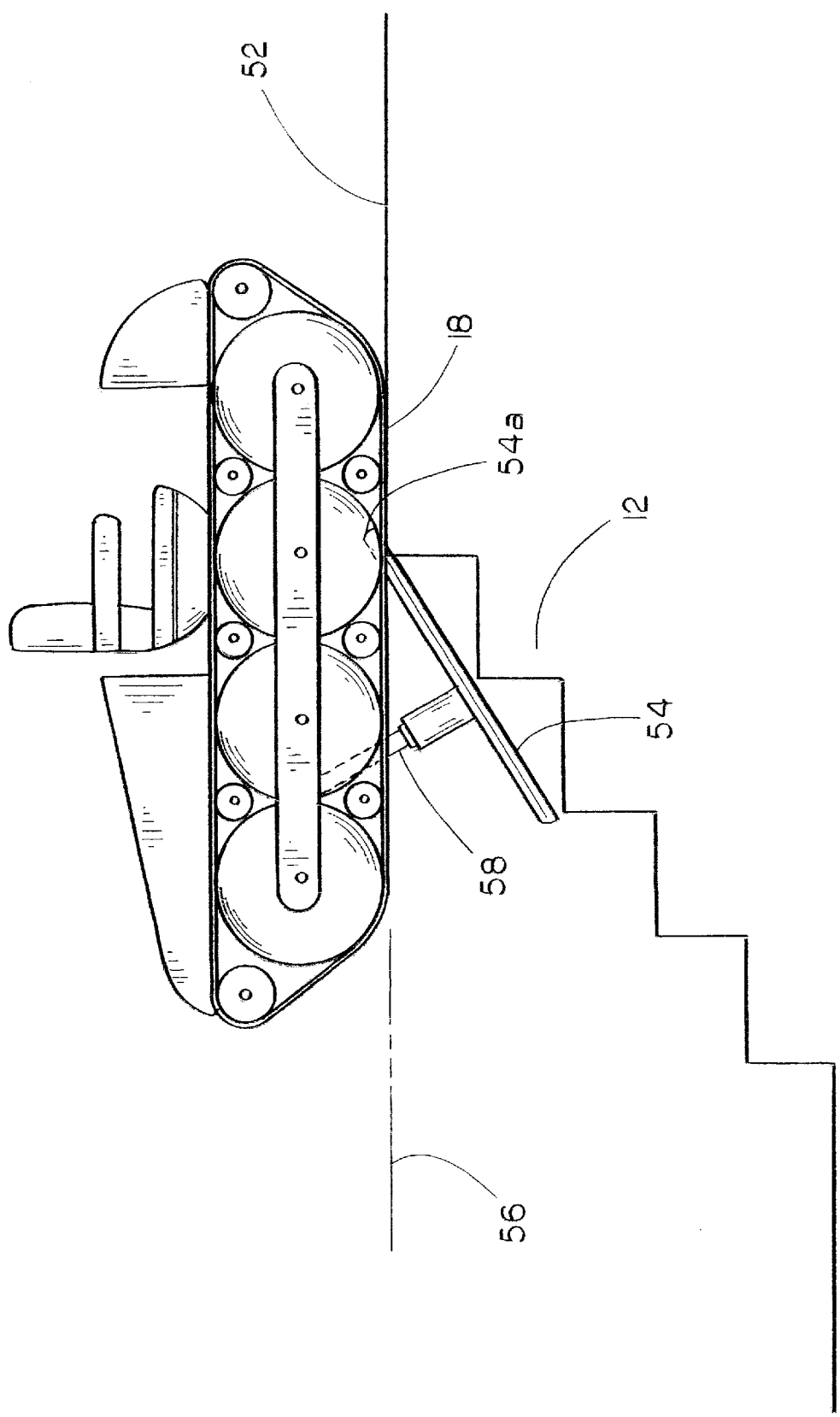
FIG. 4 is a view similar to FIG. 2, but with the vehicle at the top of the steps and moving in a horizontal position on to the landing.

Referring now to FIG. 4, it can be seen that the progression of the vehicle to the top of the flight of stairs leaves the forward end of the vehicle projecting upwardly over the top step. In order to bring the forward end of each track 18 into engagement with the surface 52 of the landing, as shown in FIG. 4, a rearward lifter arm 54 is operably mounted between the tracks 18. Lifter arm 54 is pivotally connected at a forward end 54a to frame 20 at a position vertically above the drive plane 56 of the bottom of the tracks 18. Drive plane 56 is defined as the plane tangent with the bottom of tracks 18. An hydraulic cylinder 58 is pivotally connected between the rearward end of the lifter arm 54 and the vehicle frame, to selectively lower the arm downwardly below the drive plane 56, and thereby raise the rearward end of the vehicle 10. As vehicle 10 approaches the upper landing of the stairs 12, and before the center of gravity of the vehicle shifts to bring the forward end downward into a horizontal position, lifter arm 54 is activated by a switch to lift the rearward end of the vehicle 10 to a horizontal position. As the vehicle moves forwardly and horizontally onto the surface 52 of the landing, the lifter is raised upwardly into a storage position above the drive plane 56.

Figure 5:
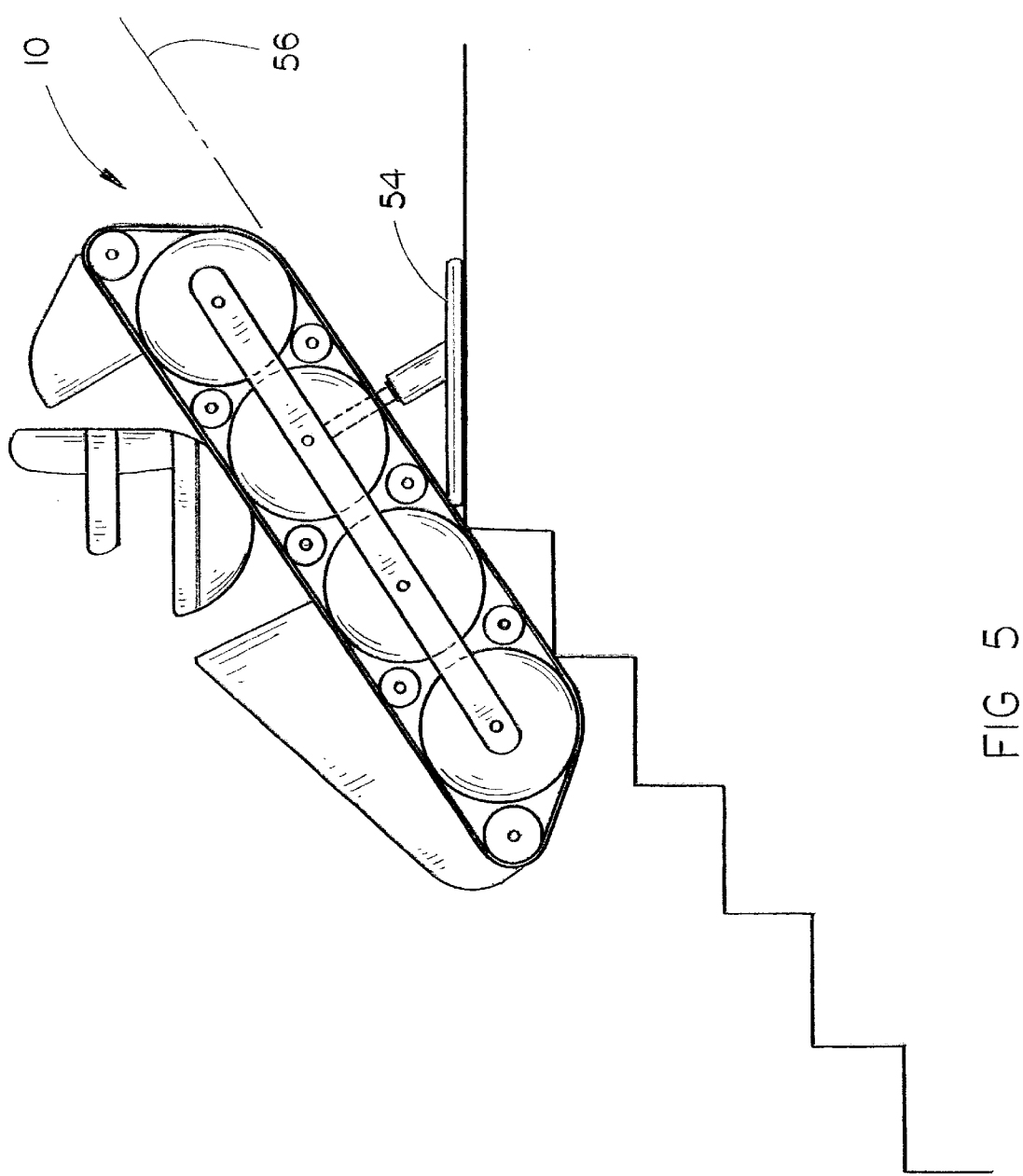
FIG. 5 is a view similar to FIG. 4, but with the vehicle at the top of the steps and moved to a descending position from the landing.

Referring now to FIG. 5, the vehicle is shown in a position ready to proceed down stairs 12. Lifter arm 54 has already been operated to lift the rearward end of the vehicle upwardly so that the drive plane 56 of the tracks 18 is oriented generally coplanar with the slope of stairs 12. This prevents a sudden drop of the front end of the vehicle 10 as the vehicle first enters the descending slope of the stairs 12. As the vehicle proceeds down the stairs, the lifter arm 54 is again raised to the storage position above the drive plane.

While the vehicle 10 is shown with only one lifter arm 54, it should be clear that a second lifter arm could be mounted on the forward end of the vehicle 10, in a reversed position, so that the vehicle would not have to turn around to enjoy the benefit of the lifter arm 54. Similarly, the lifter arm could either be the rigid member shown in the drawings, or a series of rollers, permitting movement of the vehicle 10 while the arm 54 is in the lowered position.

Whereas the invention has been shown and described in connection with the preferred embodiment thereof, many modifications, substitutions and additions may be made which are within the intended broad scope of the appended claims.

What is claimed is:

1. A personal mobility vehicle, comprising:

a frame with a pair of parallel tracks for moving the vehicle, each track having a lower surface forming a drive plane for the tracks;

a plurality of drive wheels mounted within each track for driving the tracks forwardly and rearwardly;

a lift wheel interposed in each track forwardly of the drive wheels, said lift wheels positioned to form a flight on each track which slopes forwardly and upwardly from the drive plane of the tracks;

a rearward lift wheel interposed in each track rearwardly of the drive wheels, said rearward lift wheels positioned to form a flight on each track which slopes rearwardly and upwardly from the drive plane of the tracks; and a seat operably mounted on the frame, and having support means for moving the seat about a generally horizontal axis normal to a longitudinal axis of the tracks, to maintain the seat in a generally upright position as the vehicle moves up or down a slope;

said seat operably mounted for rotational movement on a vertical axis, to permit the seat to swivel to the side;

said seat including a pair of armrests thereon and further including control means mounted on one of the armrests for controlling the tracks and the direction of movement of the vehicle.

2. The personal mobility vehicle of claim 1, further comprising a retractable stabilizer mounted to the frame and operable to selectively extend a roller on a rod rearwardly from the frame, said rod operable between an extended position located to prevent the vehicle from tipping over rearwardly during an ascent up a steep slope, and a retracted position.

3. The personal mobility vehicle of claim 2, further comprising a lifter arm operably mounted on the frame, with a forward end pivotally connected to the frame at a location spaced above the drive plane, and a rearward end pivotal between a lowered position spaced below the drive plane and a storage position spaced above the drive plane, and further comprising means for selectively raising and lowering the lifter arm.

4. A personal mobility vehicle, comprising:

a frame with a pair of parallel tracks for moving the vehicle, each track having a lower surface forming a drive plane for the tracks;

a plurality of drive wheels mounted within each track for driving the tracks forwardly and rearwardly;

a lift wheel interposed in each track forwardly of the drive wheels, said lift wheels positioned to form a flight on each track which slopes forwardly and upwardly from the drive plane of the tracks;

a rearward lift wheel interposed in each track rearwardly of the drive wheels, said rearward lift wheels positioned to form a flight on each track which slopes rearwardly and upwardly from the drive plane of the tracks; and a seat operably mounted on the frame, and having support means for moving the seat about a generally horizontal axis normal to a longitudinal axis of the tracks, to maintain the seat in a generally upright position as the vehicle moves up or down a slope;

said seat operably mounted for rotational movement on a vertical axis, to permit the seat to swivel to the side.

5. A personal mobility vehicle, comprising:
a frame with a pair of parallel tracks for moving the vehicle, each track having a lower surface forming a drive plane for the tracks;
a seat operably mounted on the frame, and having support means for moving the seat about a generally horizontal axis normal to a longitudinal axis of the tracks, to maintain the seat in a generally upright position as the vehicle moves up or down a slope;
said seat operably mounted for rotational movement on a vertical axis, to permit the seat to swivel to the side; and
a retractable stabilizer mounted to the frame and operable to selectively extend a roller on a rod rearwardly from the frame, said rod operable between an extended position located to prevent the vehicle from tipping over rearwardly during an ascent up a steep slope, and a retracted position.

6. The personal mobility vehicle of claim 5, further comprising a lifter arm operably mounted on the frame, with a forward end pivotally connected to the frame at a location spaced above the drive plane, and a rearward end pivotal between a lowered position spaced below the drive plane and a storage position spaced above the drive plane, and further comprising means for selectively raising and lowering the lifter arm.

* * * * *